United States Patent
Henry et al.

(10) Patent No.: US 7,328,328 B2
(45) Date of Patent: *Feb. 5, 2008

(54) NON-TEMPORAL MEMORY REFERENCE CONTROL MECHANISM

(75) Inventors: G. Glenn Henry, Austin, TX (US); Rodney E. Hooker, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 10/227,583

(22) Filed: Aug. 22, 2002

(65) Prior Publication Data

US 2003/0159020 A1    Aug. 21, 2003

Related U.S. Application Data

(60) Provisional application No. 60/358,183, filed on Feb. 19, 2002.

(51) Int. Cl.
*G06F 9/318* (2006.01)
*G06F 9/34* (2006.01)

(52) U.S. Cl. ............... 712/213; 712/210; 712/227

(58) Field of Classification Search ............ 712/203, 712/209, 210, 213, 227, 229, 300; 703/26
See application file for complete search history.

(56) References Cited

U.S. PATENT DOCUMENTS

| | | |
|---|---|---|
| 3,657,705 A | 4/1972 | Mekota et al. |
| 4,064,554 A | 12/1977 | Tubbs |
| 4,217,638 A | 8/1980 | Namimoto et al. |
| 4,547,849 A | 10/1985 | Louie et al. |

(Continued)

FOREIGN PATENT DOCUMENTS

CN        1431584        7/2003

(Continued)

OTHER PUBLICATIONS

Paap et al, "Power PC™: A Performance Architecture," COMPCON Spring '93, Digest of Papers, San Francisco, CA, IEEE Computer Society, Feb. 22, 1993, pp. 104-108.

(Continued)

*Primary Examiner*—Daniel H. Pan
(74) *Attorney, Agent, or Firm*—Richard K. Huffman; James W. Huffman

(57) ABSTRACT

An apparatus and method are provided for extending a microprocessor instruction set to specify non-temporal memory references at the instruction level. The apparatus includes translation logic and extended execution logic. The translation logic translates an extended instruction into a micro instruction sequence. The extended instruction has an extended prefix and an extended prefix tag. The extended prefix specifies a non-temporal access for a memory reference prescribed by the extended instruction, where the non-temporal access cannot be specified by an existing instruction from an existing instruction set. The extended prefix tag indicates the extended prefix, where the extended prefix tag is an otherwise architecturally specified opcode within the existing instruction set. The extended execution logic is coupled to the translation logic. The extended execution logic receives the micro instruction sequence, and executes the non-temporal access to perform the memory reference.

30 Claims, 6 Drawing Sheets

U.S. PATENT DOCUMENTS

| | | | |
|---|---|---|---|
| 5,029,069 A * | 7/1991 | Sakamura | 712/234 |
| 5,142,679 A * | 8/1992 | Owaki et al. | 717/151 |
| 5,218,712 A | 6/1993 | Cutler et al. | |
| 5,448,744 A | 9/1995 | Eifert et al. | |
| 5,471,595 A | 11/1995 | Yagi et al. | |
| 5,481,684 A | 1/1996 | Richter et al. | |
| 5,687,338 A | 11/1997 | Boggs et al. | |
| 5,751,996 A | 5/1998 | Glew et al. | |
| 5,768,574 A | 6/1998 | Dutton et al. | |
| 5,778,220 A | 7/1998 | Abramson et al. | |
| 5,796,973 A * | 8/1998 | Witt et al. | 712/208 |
| 5,822,778 A | 10/1998 | Dutton et al. | |
| 5,826,089 A | 10/1998 | Ireton | |
| 5,857,103 A | 1/1999 | Grove | |
| 5,875,342 A | 2/1999 | Temple | |
| 5,913,049 A | 6/1999 | Shiell et al. | |
| 5,937,199 A | 8/1999 | Temple | |
| 5,991,872 A | 11/1999 | Shiraishi et al. | |
| 6,014,735 A | 1/2000 | Chennupaty et al. | |
| 6,029,222 A | 2/2000 | Kamiya | |
| 6,058,472 A | 5/2000 | Panwar et al. | |
| 6,085,312 A | 7/2000 | Abdallah et al. | |
| 6,157,996 A | 12/2000 | Christie et al. | |
| 6,199,155 B1 | 3/2001 | Kishida et al. | |
| 6,230,259 B1 | 5/2001 | Christie et al. | |
| 6,317,822 B1 | 11/2001 | Padwekar | |
| 6,351,806 B1 | 2/2002 | Wyland | |
| 6,434,693 B1 | 8/2002 | Senter | |
| 6,456,891 B1 | 9/2002 | Kranich et al. | |
| 6,549,999 B2 | 4/2003 | Kishida et al. | |
| 6,560,694 B1 | 5/2003 | McGrath et al. | |
| 6,581,154 B1 | 6/2003 | Zaidi | |
| 6,647,488 B1 | 11/2003 | Takeno et al. | |
| 6,823,414 B2 | 11/2004 | Radhakrishna | |
| 6,883,053 B2 | 4/2005 | Shinagawa et al. | |
| 2001/0013870 A1 | 8/2001 | Pentkovski et al. | |
| 2002/0194457 A1 | 12/2002 | Akkary | |
| 2003/0154359 A1 * | 8/2003 | Henry et al. | 712/209 |
| 2003/0159009 A1 * | 8/2003 | Henry et al. | 711/154 |
| 2003/0159020 A1 | 8/2003 | Henry et al. | |
| 2003/0172252 A1 | 9/2003 | Henry et al. | |
| 2003/0188130 A1 * | 10/2003 | Henry et al. | 712/209 |
| 2003/0188140 A1 * | 10/2003 | Henry et al. | 712/226 |
| 2003/0196077 A1 * | 10/2003 | Henry et al. | 712/245 |
| 2005/0102492 A1 | 5/2005 | Henry et al. | |
| 2005/0188179 A1 | 8/2005 | Henry et al. | |

FOREIGN PATENT DOCUMENTS

| | | |
|---|---|---|
| EP | 0550289 A | 7/1993 |
| EP | 0942359 A | 9/1999 |
| EP | 0947919 A | 10/1999 |
| WO | WO-9722922 A1 | 6/1997 |

OTHER PUBLICATIONS

Silberman et al. *An Architectural Framework for Supporting Heterogeneous Instruction-Set Architectures.* Computer, IEEE Computer Society, Long Beach, CA. US vol. 26, No. 6 Jun. 1, 1993. pp. 39-56. ISSN: 0018-0162.

Intel Architecture Software Developer's Manual, vol. 2: Instruction Set Reference. 1999. pp. 2-1 to 2-4, 3-332, 3-353 and B25.

Petterson & Hennessy. "Computer Organization and Design: The Hardware/Software Interface." 1998. Morgan Kaufmann Publishers, Inc. Second Edition. pp. 177-176, 297.

Dobb. "Microprocessor Resources." 2000. archive.org/web200001 18231610x86.org/secrets/opcodes/icebp.htm.

* cited by examiner

*Fig. 1 (Related Art)*

*Microprocessor Instruction Format*

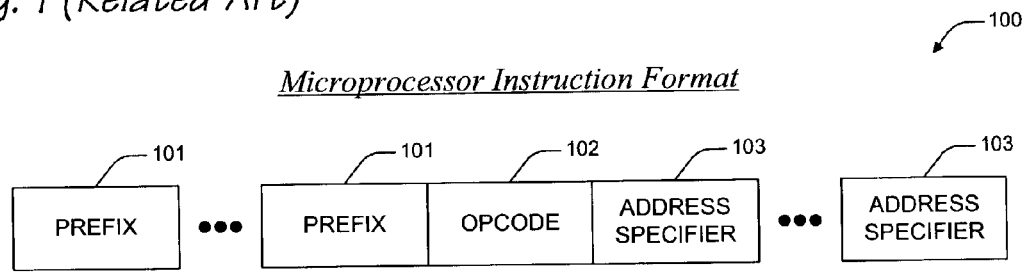

*Fig. 2 (Related Art)*

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3
Extended Instruction Format

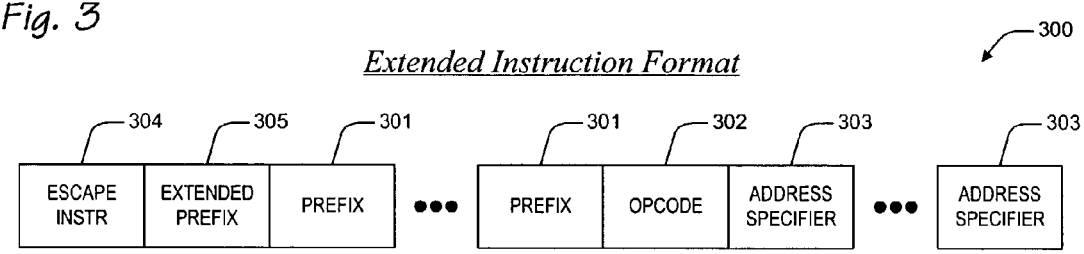

Fig. 4
8-Bit Extended Prefix Map

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Microprocessor For Prescribing Non-Temporal Memory Reference*

*Extended Prefix for Prescribing Non-Temporal Memory Access*

*Translate Stage Details*

Execute Stage Details

*Method for Non-Temporal Memory Reference Control*

NON-TEMPORAL MEMORY REFERENCE CONTROL MECHANISM

CROSS-REFERENCE TO RELATED APPLICATIONS

This application claims the benefit of U.S. Provisional Application No. 60/358,183 filed on Feb. 19, 2002.

This application is related to the following co-pending U.S. patent applications, all of which have a common assignee and common inventors.

| SERIAL NUMBER | FILING DATE | DOCKET NUMBER | TITLE |
| --- | --- | --- | --- |
| 10/144,595 | May 9, 2002 | CNTR.2176 | APPARATUS AND METHOD FOR EXTENDING A MICROPROCESSOR INSTRUCTION SET |
| 10/144,592 | May 9, 2002 | CNTR.2186 | APPARATUS AND METHOD FOR CONDITIONAL INSTRUCTION EXECUTION |
| 10/227,572 | Aug. 22, 2002 | CNTR.2187 | APPARATUS AND METHOD FOR SELECTIVE MEMORY ATTRIBUTE CONTROL |
| 10/144,593 | May 9, 2002 | CNTR.2188 | APPARATUS AND METHOD FOR SELECTIVE CONTROL OF CONDITION CODE WRITE BACK |
| 10/144,590 | May 9, 2002 | CNTR.2189 | MECHANISM FOR EXTENDING THE NUMBER OF REGISTERS IN A MICROPROCESSOR |
| 10/227,008 | Aug. 22, 2002 | CNTR.2190 | APPARATUS AND METHOD FOR EXTENDING DATA MODES IN A MICROPROCESSOR |
| 10/227,571 | Aug. 22, 2002 | CNTR.2191 | APPARATUS AND METHOD FOR EXTENDING ADDRESS MODES IN A MICROPROCESSOR |
| 10/283,397 | Oct. 29, 2002 | CNTR.2192 | SUPPRESSION OF STORE CHECKING |
| 10/384,390 | Mar. 10, 2003 | CNTR.2193 | SELECTIVE INTERRUPT SUPPRESSION |
| 10/144,589 | May 9, 2002 | CNTR.2198 | APPARATUS AND METHOD FOR SELECTIVE CONTROL OF RESULTS WRITE BACK |

BACKGROUND OF THE INVENTION

1. Field of the Invention

This invention relates in general to the field of microelectronics, and more particularly to a technique for incorporating non-temporal memory attribute control at the instruction level into an existing microprocessor instruction set architecture.

2. Description of the Related Art

Since microprocessors were fielded in the early 1970's, their use has grown exponentially. Originally applied in the scientific and technical fields, microprocessor use has moved over time from those specialty fields into commercial consumer fields that include products such as desktop and laptop computers, video game controllers, and many other common household and business devices.

Along with this explosive growth in use, the art has experienced a corresponding technology pull that is characterized by an escalating demand for increased speed, expanded addressing capabilities, faster memory accesses, larger operand size, more types of general purpose operations (e.g., floating point, single-instruction multiple data (SIMD), conditional moves, etc.), and added special purpose operations (e.g., digital signal processing functions and other multi-media operations). This technology pull has resulted in an incredible number of advances in the art which have been incorporated in microprocessor designs such as extensive pipelining, super-scalar architectures, cache structures, out-of-order processing, burst access mechanisms, branch prediction, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor—legacy compatibility—furthermore accounts for much of the complexity that is present in a modern microprocessor. For market-driven reasons, many producers have opted to retain all of the capabilities that are required to insure compatibility with older, so-called legacy application programs as new designs are provided which incorporate new architectural features.

Nowhere has this legacy compatibility burden been more noticeable than in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet while in the past developers have been able to incorporate newly developed architectural features into existing instruction set architectures, the means whereby use of these features is enabled—programmable instructions—are becoming scarce. More specifically, there are no more "spare" instructions in certain instruction sets of interest that provide designers with a way to incorporate newer features into an existing architecture.

In the x86 instruction set architecture, for example, there are no remaining undefined 1-byte opcode states. All 256 opcode states in the primary 1-byte x86 opcode map are taken up with existing instructions. As a result, x86 microprocessor designers must presently make a choice either to provide new features or to retain legacy compatibility. If new programmable features are to be provided, then they must be assigned to opcode states in order for programmers to exercise those features. And if spare opcode states do not remain in an existing instruction set architecture, then some of the existing opcode states must be redefined to provide for specification of the new features. Thus, legacy compatibility is sacrificed in order to make way for new feature growth.

One particular problem area that concerns microprocessor designers today relates to the efficient employment of cache structures by application programs. As cache technologies have evolved, more and more features have been provided that allow system programmers to control when and how memory caches are employed in a system. Early cache control features only provided an on/off capability. By setting bits in an internal register of a microprocessor, or by asserting certain external signal pins on its package, designers could enable caching of memory or they could render an entire memory space as uncacheable. Uncacheable memory references (i.e., loads/reads and stores/writes) are always provided to a system memory bus and thus incur the latencies commensurate with external bus architectures. Conversely, memory references, or accesses, to a cache are provided to the system memory bus only when a cache miss occurs (i.e., when the object of a memory reference is either not present or is not valid within internal cache). Cache features have enabled application programs to experience dramatic improvements in execution speed, particularly for those programs that make repeated references to the same data structure in memory.

More recent microprocessor architecture improvements have allowed system designers to more precisely control how cache features are employed. These improvements permit the designers to define the properties of a range of addresses within a microprocessor's address space in terms of how references to those addresses are executed by the microprocessor with regard to its cache hierarchy. Generally speaking, references to those addresses can be defined as uncacheable, write combining, write through, write back, or write protected. These properties are known as memory attributes, or memory traits. Hence, store references to an address having a write back attribute are provided to cache and are speculatively executed. Store references to a different address having an uncacheable trait are sent to the system bus and are not speculatively executed.

It is not within the scope of the present application to provide an in-depth description of memory attributes and how specific attributes are processed by a microprocessor with regard to its cache. It is sufficient herein to understand that the state of the art enables designers to assign a memory attribute to a region of memory and that all subsequent memory references to addresses within that region will be executed according to the cache policy associated with the prescribed memory attribute.

Although present day microprocessor designs allow different regions of memory to be assigned different memory traits, the designs are limited in two significant respects. First, microprocessor instruction set architectures restrict execution of instructions for defining/changing memory traits to a privilege level that is inaccessible by user-level applications. Accordingly, when a desktop/laptop microprocessor boots up, its operating system establishes the memory traits for virtual memory space prior to invocation of any user-level application program. The user-level applications are thus precluded from changing the memory traits of the host system. Secondly, the level of granularity provided by a present day microprocessor for establishing memory traits is page level at best. In conventional architectures that allow memory paging, the memory attributes of each memory page are defined by the operating system within page directory/table entries. Hence, all references to addresses within a particular page will employ the memory attribute assigned to the particular page during execution of the associated memory access operation.

For many applications, the above control features have allowed user-level programs to experience marked improvements in execution speed, but the present inventors have noted that other applications are limited because present day memory trait controls are not available for employment at the user level, and furthermore because memory attributes can only be established with page-level granularity. For example, a user program that makes repeated accesses to a first data structure will suffer when an incidental reference to a second data structure occurs, under the conditions where the cache entries of the first data structure must be flushed to provide space within the cache for the second data structure. Because operating systems have no a priori knowledge of the frequency of references to data structures by user-level application programs, application data spaces are typically assigned a write back trait, thus setting up the conditions for the above noted conflict. And an application programmer has no means to alter the assigned trait to force the incidental reference to go to the memory bus (e.g., assign an uncacheable trait to the second data structure), thereby precluding the conflict.

Within the art, data that is repeatedly accessed by an application program is referred to as temporal data and data associated with incidental references is called non-temporal data. One skilled in the art will also appreciate that filling up a cache with non-temporal data (i.e., cache pollution) is very disadvantageous. Consequently, more recent advances in the art have provided existing instruction sets with a limited set of non-temporal store instructions that allow application programmers to move data from internal registers to memory without polluting the cache. However, no means currently exists whereby a programmer can direct that a memory reference specified by an existing instruction (e.g., an instruction prescribing an arithmetic or logical operation that employs one or more memory operands) be executed non-temporally, thus bypassing cache altogether.

Therefore, what is needed is an apparatus and method that incorporate instruction level non-temporal memory reference control features into an existing microprocessor architecture having a completely full opcode set, where incorporation of the memory reference control features allows a conforming microprocessor to retain the capability to execute legacy application programs while concurrently providing application programmers with the capability to specify non-temporal memory accesses.

SUMMARY OF THE INVENTION

The present invention, among other applications, is directed to overcoming these and other problems and disadvantages of the prior art. The present invention provides a superior technique for extending a microprocessor instruction set beyond its current capabilities to provide for instruction-level non-temporal memory reference control. In one embodiment, an apparatus provides for instruction level control of memory references within a microprocessor. The apparatus includes a translation unit logic and extended execution unit. The translation unit translates an extended instruction into a micro instruction sequence. The extended instruction directs the microprocessor to perform a non-temporal access to a memory. The extended instruction has an extended prefix and an extended prefix tag. The extended prefix specifies a non-temporal access for a memory reference prescribed by the extended instruction, where the non-temporal access cannot be specified by an existing instruction from an existing instruction set. The extended prefix tag indicates the extended prefix to the translation logic, where the extended prefix tag is an otherwise architecturally specified opcode within the existing instruction set. The extended execution unit is coupled to the translation unit. The extended execution unit receives the micro instruction sequence, and executes the non-temporal access to perform the non-temporal access to the memory.

One aspect of the present invention contemplates a microprocessor apparatus, for extending an existing instruction set to provide for instruction level non-temporal memory access control. The microprocessor apparatus has an extended instruction and a translator. The extended instruction prescribes a non-temporal access for a memory reference. The extended instruction includes a selected opcode in the existing instruction set followed by an n-bit extended prefix. The selected opcode indicates the extended instruction and the n-bit extended prefix indicates the non-temporal access. The non-temporal access for the memory reference cannot otherwise be prescribed by an instruction according to the existing instruction set. The translator receives the extended instruction, and generates a micro instruction sequence directing a microprocessor to execute the memory reference via the non-temporal access.

Another aspect of the present invention comprehends an apparatus, for adding instruction level non-temporal access control features to a corresponding instruction that is stored in a computer readable storage, where the corresponding instruction is part of an existing instruction set. The apparatus has an escape tag, a non-temporal access specifier, and extended execution logic. The escape tag is received by translation logic, and indicates that accompanying parts of the corresponding instruction prescribe a memory reference, where the escape tag is a first opcode within the existing instruction set. The non-temporal access specifier is coupled to the escape tag and is one of the accompanying parts, where the non-temporal access directs a microprocessor to preclude caching of data corresponding to the memory reference. The non-temporal access specifier prescribes that a non-temporal access be employed to perform the memory reference. The extended execution unit is coupled to the translation logic, and executes the memory reference via the non-temporal access. The translation unit translates the escape tag and the accompanying parts into corresponding micro instructions that direct the extended execution unit to perform said memory reference via said non-temporal access.

A further aspect of the present invention provides a method for extending an existing instruction set architecture to provide for non-temporal memory reference control at the instruction level. The method includes providing an extended instruction from a memory to a microprocessor the extended instruction including an extended tag along with an extended prefix, where the extended tag is a first opcode entity according to the existing instruction set architecture; prescribing, via the extended prefix, that a non-temporal access be employed by the microprocessor for a corresponding memory reference, where the memory reference is specified by remaining parts of the extended instruction; and executing the memory reference employing the non-temporal access, wherein the non-temporal access precludes the microprocessor from caching data corresponding to the memory reference.

BRIEF DESCRIPTION OF THE DRAWINGS

These and other objects, features, and advantages of the present invention will become better understood with regard to the following description, and accompanying drawings where:

FIG. 1 is a block diagram illustrating a related art microprocessor instruction format;

FIG. 2 is a table depicting how instructions in a instruction set architecture are mapped to logic states of bits in an 8-bit opcode byte within the instruction format of FIG. 1;

FIG. 3 is a block diagram featuring an extended instruction format according to the present invention;

FIG. 4 is a table showing how extended architectural features are mapped to logic states of bits in an 8-bit extended prefix embodiment according to the present invention;

DETAILED DESCRIPTION

Figure 5:
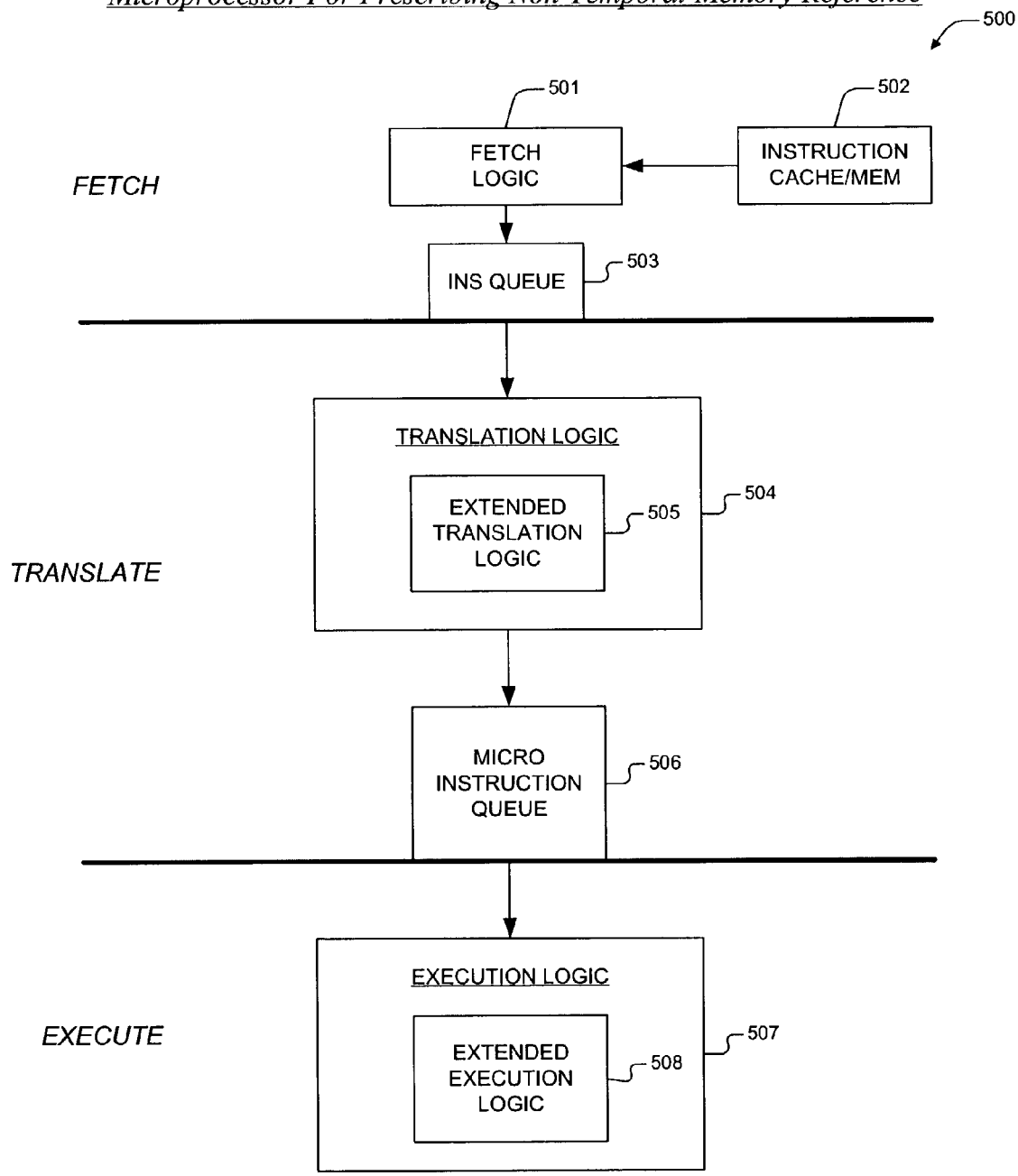
FIG. 5 is a block diagram illustrating a pipeline microprocessor for employing non-temporal memory reference control according to the present invention.

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

In view of the above background discussion on the techniques employed within present day microprocessors to extend the architectural features of those microprocessors beyond the capabilities of their associated instruction sets, a related art example will now be discussed with reference to FIGS. 1–2. The discussion highlights the problems that microprocessor designers routinely face today. On the one hand, they desire to incorporate more recently developed architectural features into a microprocessor design and, on the other hand, market conditions dictate that they must retain the capability to execute legacy application programs. In the example of FIGS. 1–2, a completely defined opcode map rules out the possibility of defining new opcodes for the exemplary architecture. Thus, the designers are compelled to choose either to incorporate the new features and sacrifice legacy compatibility to some extent, or to forego more recent architectural advances altogether in favor of maintaining the ability to execute older application programs. Following the related art discussion, a discussion of the present invention will be provided with reference to FIGS. 3–11. By employing an existing, yet obsolete, opcode as a prefix tag for an extended instruction that follows, the present invention enables microprocessor designers to overcome the limitations of completely full instruction set architectures, thereby allowing them to provide programmers with the capability to specify non-temporal memory access at the instruction level for a specific memory reference while concurrently retaining all the features that are required to run legacy application programs.

Turning to FIG. 1, a block diagram is presented illustrating a related art microprocessor instruction format 100. The related art instruction 100 has a variable number of instruction entities 101–103, each set to a specified value, that together make up a specific instruction 100 for a microprocessor. The specific instruction 100 directs the microprocessor to perform a specific operation such as adding two operands together, or moving an operand from/to memory to/from an internal register. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. Typically, these architectural features can be applied to most of the operations prescribed by any of the opcodes 102 in the instruction set. For example, prefixes 101 in many present day microprocessors direct operations to be executed using different virtual address sizes (e.g., 8-bit, 16-bit, 32-bit). Accordingly, these processors are programmed to a default address size (say, 32-bit), and prefixes 101 are provided in their respective instruction sets enabling programmers to selectively override the default operand size (say, to generate 16-bit virtual addresses) on an instruction-by-instruction basis. Selectable address size is merely one example of an architectural feature that spans a significant number of the operations (e.g., add, subtract, multiply, Boolean logic, etc.) prescribed by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to alternative translation rules (i.e., prefix value 0FH, which causes translation to be performed according to the so-called 2-byte opcode rules), and other prefixes 101 which cause particular operations to be repeated until repetition criteria are satisfied (i.e., the REP opcodes: F0H, F2H, and F3H).

Referring now to FIG. 2, a table 200 is presented depicting how instructions 201 in an instruction set architecture are mapped to values of bits in an 8-bit opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding instruction opcode 201 (i.e., instruction I02 201). In the particular case of the x86 opcode map, it is well known in the art that opcode value 14H is mapped to the x86 Add With Carry (ADC) instruction opcode, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). Features such as described in this x86 example are enabled in part in a present day microprocessor because instruction translation/decoding logic in the microprocessor interprets the entities 101–103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features that have been more recently incorporated such as single instruction multiple data (SIMD) operations and conditional move operations.

The incorporation of architectural feature advances has been accomplished in the past through the designation of available/spare opcode values 201 as prefixes 101 (also known as architectural feature tags/indicators 101 or escape instructions 101). Yet, many instruction set architectures 100 have run into a brick wall in terms of providing enhancements for a very straightforward reason: all of the available/spare opcode states have been used up, that is, all of the opcode values in the opcode map 200 have been architecturally specified. When all of the available opcode values have been assigned as either opcode entities 102 or prefix entities 101, then there are no more values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a fully populated 6-bit opcode map would exhibit 64 architecturally defined opcodes/prefixes 201 and would likewise provide no available/spare opcode values for expansion.

One alternative that stops short of entirely obliterating an existing instruction set and replacing it with a new format 100 and opcode map 200 is to substitute new instruction meanings for only a small subset of existing opcodes 201 that are presently used by application this hybrid technique, a conforming microprocessor operates exclusively in one of two operating modes: a legacy-compatible mode, where opcodes 40H–4FH are interpreted according to legacy rules, or an enhanced mode, where opcodes 40H–4FH are interpreted according to enhanced architectural rules. This technique indeed enables designers to incorporate new features into a design, but when the conforming microprocessor is running in an enhanced mode it excludes execution of any application program that uses opcodes 40H–4FH. Hence, from the standpoint of retaining legacy compatibility, the legacy-compatible/enhanced mode technique is not optimum.

The present inventors, however, have noted the frequency of use of certain opcodes 201 in instruction sets 200 having fully-populated opcode spaces over the breadth of application programs composed for execution on compliant microprocessors. They have accordingly observed that there are some opcodes 202 which, although they are architecturally defined, are not employed within application programs that are capable of being executed by the microprocessors. Instruction IF1 202 is depicted in FIG. 2 as such an example of this singularity. In fact, the very same opcode value 202 (i.e., F1H) maps to a valid instruction 202 in the x86 instruction set architecture that is not presently employed by any extant application program. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is known as In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet obsolete, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into an existing microprocessor design, while concurrently retaining complete compatibility with all legacy software.

The present invention exploits the prefix tag/extended prefix concept by providing an n-bit extended non-temporal access specifier prefix whereby programmers are enabled to prescribe a non-temporal memory access for a corresponding memory reference operation on an instruction-by-instruction basis in a microprocessor. During execution of the corresponding memory reference operation, the non-temporal memory access is accomplished in lieu of a cache-based access according to a default attribute that is prescribed in memory trait descriptor tables/mechanisms previously established by operating system applications. The present invention will now be discussed with reference to FIGS. 3–11.

Turning to FIG. 3, a block diagram is presented featuring an extended instruction format 300 according to the present invention. Very much like the format 100 discussed with reference to FIG. 1, the extended instruction format 300 has a variable number of instruction entities 301–305, each set to a specified value, that together make up a specific instruction 300 for a microprocessor. The specific instruction 300 directs the microprocessor to perform a specific operation such as adding two operands together, or moving an operand from memory to a register within the microprocessor. Typically, an opcode entity 302 in the instruction 300 prescribes the specific operation to be performed, and optional address specifier entities 303 follow the opcode 302 prescribing additional information about the specific operation such as how the operation is to be performed, registers where the operands are located, direct and indirect data to be used in computation of memory addresses for source/result operands, etc. The instruction format 300 also allows a programmer to prefix an opcode 302 with prefix entities 301 that direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301–303 in a formatted extended instruction 300. The purpose of the two additional entities 304, 305 is to provide the capabilities for programmers to specify a non-temporal memory access for a memory reference prescribed by the extended instruction 300, where the non-temporal memory access corresponding to the memory reference is not otherwise specifiable by an existing instruction set for the conforming microprocessor. The optional entities 304, 305 are an extended instruction tag 304 and an extended non-temporal specifier prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the extended prefix 305, or extended features specifier 305, follows, where the extended prefix 305 prescribes a non-temporal access that corresponds to a specified memory reference (i.e., a load operation, a store operation, or both). In one embodiment, the escape tag 304 indicates that accompanying parts 301–303, 305 of a corresponding instruction 300 prescribe a memory reference to be performed by the microprocessor. The non-temporal access specifier 305, or extended prefix 305, prescribes that the non-temporal access be accomplished for a source operand load operation, a destination operand store operation, or both operations. Extended execution logic in the microprocessor executes the memory reference via performing the non-temporal memory access, thus circumventing cache pollution by overriding a cacheable default memory attribute for the memory reference that has been prescribed by other means through the use of control register bits, memory type registers, page tables, and other types of memory attribute descriptors employed within a present day microprocessor architecture.

To summarize the non-temporal reference control technique according to the present invention, an extended instruction is configured to prescribe a non-temporal memory access for a memory reference in an existing microprocessor instruction set, where the non-temporal access for the memory reference cannot otherwise be prescribed by instructions according to the existing microprocessor instruction set. The extended instruction includes one of the opcodes/instructions 304 in the existing instruction set and an n-bit extended prefix 305. The selected opcode/instruction serves as an indicator 304 that the instruction 300 is an extended features instruction 300 (that is, it prescribes extensions to the microprocessor architecture), and the n-bit features prefix 305 indicates that the non-temporal access applies to either a source operand, a destination operand, or both. In one embodiment, the extended prefix 305 is 8-bits in size, providing for the specification of a combination of non-temporal access control features and up to 64 other extended features. An n-bit prefix embodiment provides for the specification of up to $2^{n-2}$ other extended features in addition to non-temporal access control features.

Now turning to FIG. 4, a table 400 is presented showing how non-temporal access control features for a prescribed memory reference are mapped to logic states of bits in an 8-bit extended prefix embodiment according to the present invention. Similar to the opcode map 200 discussed with reference to FIG. 2, the table 400 of FIG. 4 presents an exemplary 8-bit extended prefix map 400 that associates up to 256 values of an 8-bit extended prefix entity 305 with corresponding extended features 401 (e.g., E34, E4D, etc.) of a conforming microprocessor, two of which direct non-temporal access. In the case of an x86 embodiment, the 8-bit extended feature prefix 305 according to the present invention serves to provide for instruction-level control of non-temporal memory accesses 401 (i.e., E00-EFF) which cannot be specified at that level by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, including those noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

Now referring to FIG. 5, a block diagram is presented illustrating a pipeline microprocessor 500 for performing non-temporal memory reference operations according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that directs the microprocessor 500 to perform the operations prescribed by the instructions. The extended translation logic 505 detects those instructions having an extended prefix tag according to the present invention and also provides for translation/decoding of corresponding extended non-temporal memory reference specifier prefixes. In an x86 embodiment, the extended translation logic 505 is configured to detect an extended prefix tag of value F1H, which is the x86 ICE BKPT opcode. Extended micro instruction fields along with are provided in the micro instruction queue 506 to allow for the prescription of source/destination non-temporal accesses for associated/memory references prescribed by accompanying parts of the instruction.

The micro instructions are provided from the micro instruction queue 506 to the execution logic 507, wherein the extended execution logic 508 is configured to execute a specified memory reference according to a default memory trait (defined by existing memory trait descriptor means) or to override the default memory trait and bypass cache altogether as specified in the extended micro instruction fields by performing a non-temporal memory access that was programmed at the user level via an extended prefix according to the present invention. In one embodiment, non-temporal store operations are handled as store operations to address ranges having a write combining attribute.

One skilled in the art will appreciate that the microprocessor 500 described with reference to FIG. 5 is a simplified representation of a present day pipeline microprocessor 500. In fact, a present day pipeline microprocessor 500 comprises upwards to 20–30 pipeline stages. However, these stages can be generally categorized into those three stage groups shown in the block diagram and thus, the block diagram 500 of FIG. 5 serves to teach the essential elements that are required to implement embodiments of the present invention as described hereinabove. Those elements of a microprocessor 500 which are extraneous to the present discussion, for clarity, are not depicted.

Figure 6:
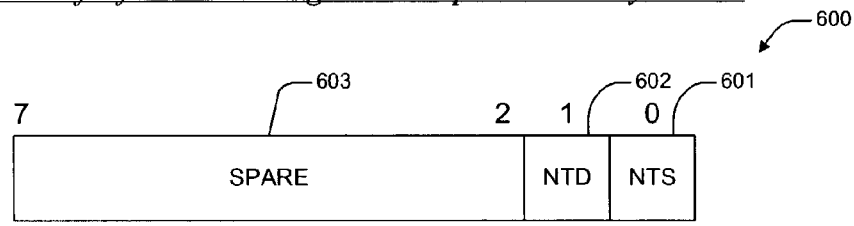
FIG. 6 is a block diagram featuring one embodiment of an extended prefix for prescribing non-temporal memory access in a microprocessor according to the present invention.

Turning now to FIG. 6, a block diagram is presented featuring one embodiment of an extended prefix 600 for prescribing a non-temporal access for a programmed memory reference in a microprocessor according to the present invention. The non-temporal access specifier prefix 600 is 8-bits in size and includes a source field 601, a destination field 602, and a spare field 603. The source field 601 prescribes that a non-temporal access be employed for source operand memory accesses (i.e., loads, reads) prescribed by remaining parts of an associated extended instruction and the destination field 602 prescribes that a non-temporal access be employed for destination operand memory accesses (i.e., stores, writes) prescribed by the remaining parts. One skilled in the art will appreciate that separately specifiable source and destination non-temporal accesses are particularly useful when employed in conjunction with repeated string instructions such as those in the x86 architecture (i.e., REP MOVS, etc.).

Figure 7:
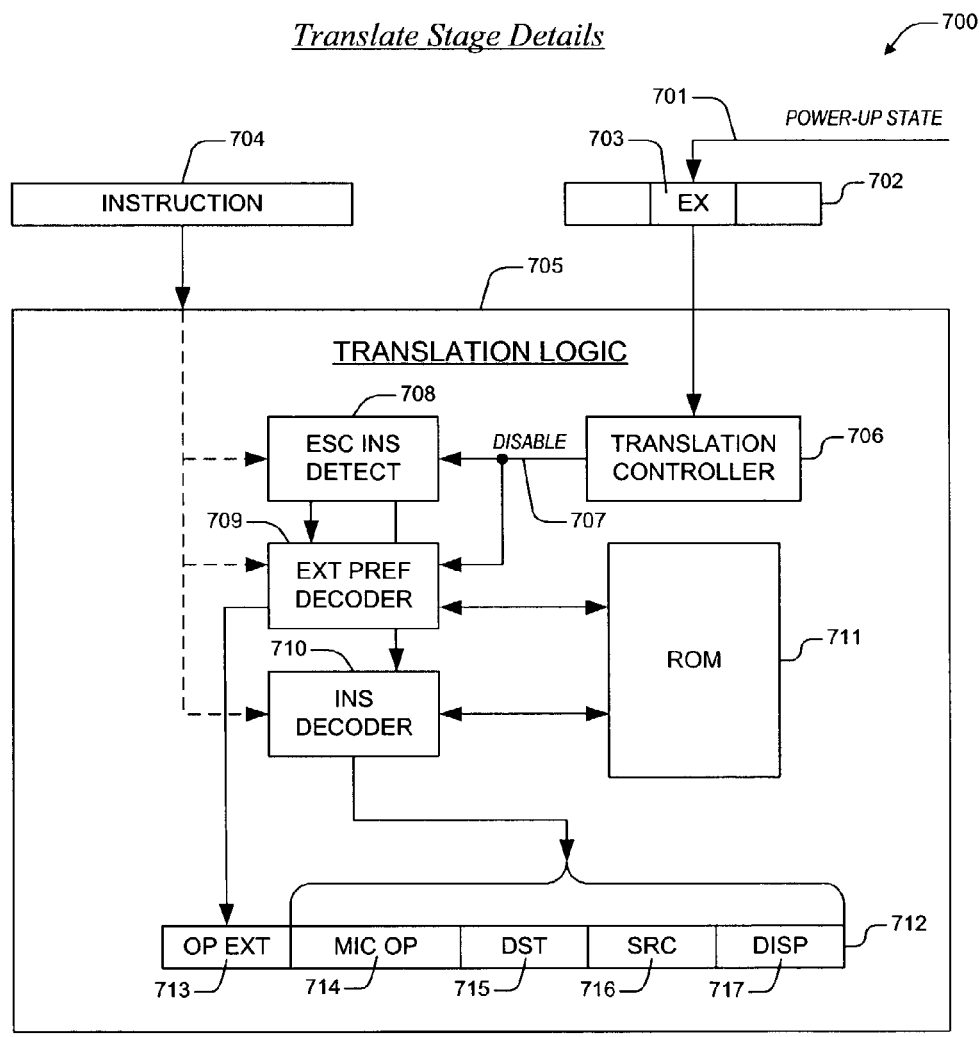
FIG. 7 is a block diagram featuring details of translate stage logic within the microprocessor of FIG. 5.

Referring now to FIG. 7, a block diagram is presented featuring details of translate stage logic 700 within the microprocessor of FIG. 5. The translate stage logic 700 has an instruction buffer 704 that provides an extended instruction to translation logic 705. The translation logic 705 is coupled to a machine specific register 702 that has an extended features field 703. The translation logic 705 has a translation controller 706 that provides a disable signal 707 to an escape instruction detector 708 and an extended decoder 709. The escape instruction detector 708 is coupled to the extended decoder 709 and an instruction decoder 710. The extended decoding logic 709 and the instruction decoding logic 710 access a control read-only memory (ROM) 711, wherein are stored template micro instruction sequences that correspond to some of the extended instructions. The translation logic 705 also has a micro instruction buffer 712 having an opcode extension field 713, a micro opcode field 714, a destination field 715, a source field 716, and a displacement field 717.

Operationally, during power-up of the microprocessor, the state of the extended field 703 within the machine specific register 702 is established via signal power-up state 701 to indicate whether the particular microprocessor is capable of translating and executing extended instructions according to the present invention for performing instruction level non-temporal memory references. In one embodiment, the signal 701 is derived from a feature control register (not shown) that reads a fuse array (not shown) configured during fabrication of the part. The machine specific register 702 provides the state of the extended features field 703 to the translation controller 706. The translation control logic 706 controls whether or not instructions from the instruction buffer 704 are translated according to extended translation rules or according to conventional translation rules. Such a control feature is provided to allow supervisory applications (e.g., BIOS) to enable/disable extended execution features of the microprocessor. If extended features are disabled, then instructions having the opcode state selected as the extended features tag would be translated according to the conventional translation rules. In an x86 embodiment having opcode state F1H selected as the tag, an occurrence of F1H under conventional translation would result in an illegal instruction exception. With extended translation disabled, the instruction decoder 710 would translate/decode all provided instructions 704 and would configure all fields 713–717 of the micro instruction 712. Under extended translation rules, however, occurrence of the tag would be detected by the escape instruction detector 708. The escape instruction detector 708 would direct the extended prefix decoder 709 to translate/decode the extended prefix portion of the extended instruction according to extended translation rules and to configure the opcode extension field 713, this directing that the non-temporal memory access be employed for a memory reference prescribed by the remaining parts of the extended instruction. The instruction decoder 710 would decode/translate to remaining parts of the extended instruction and would configure the micro opcode field 714, source field 716, destination field 715, and displacement field 717 of the micro instruction 712. Certain instructions would cause access to the control ROM 711 to obtain corresponding micro instruction sequence templates. Configured micro instructions 712 are provided to a micro instruction queue (not shown) for subsequent execution by the processor.

Figure 8:
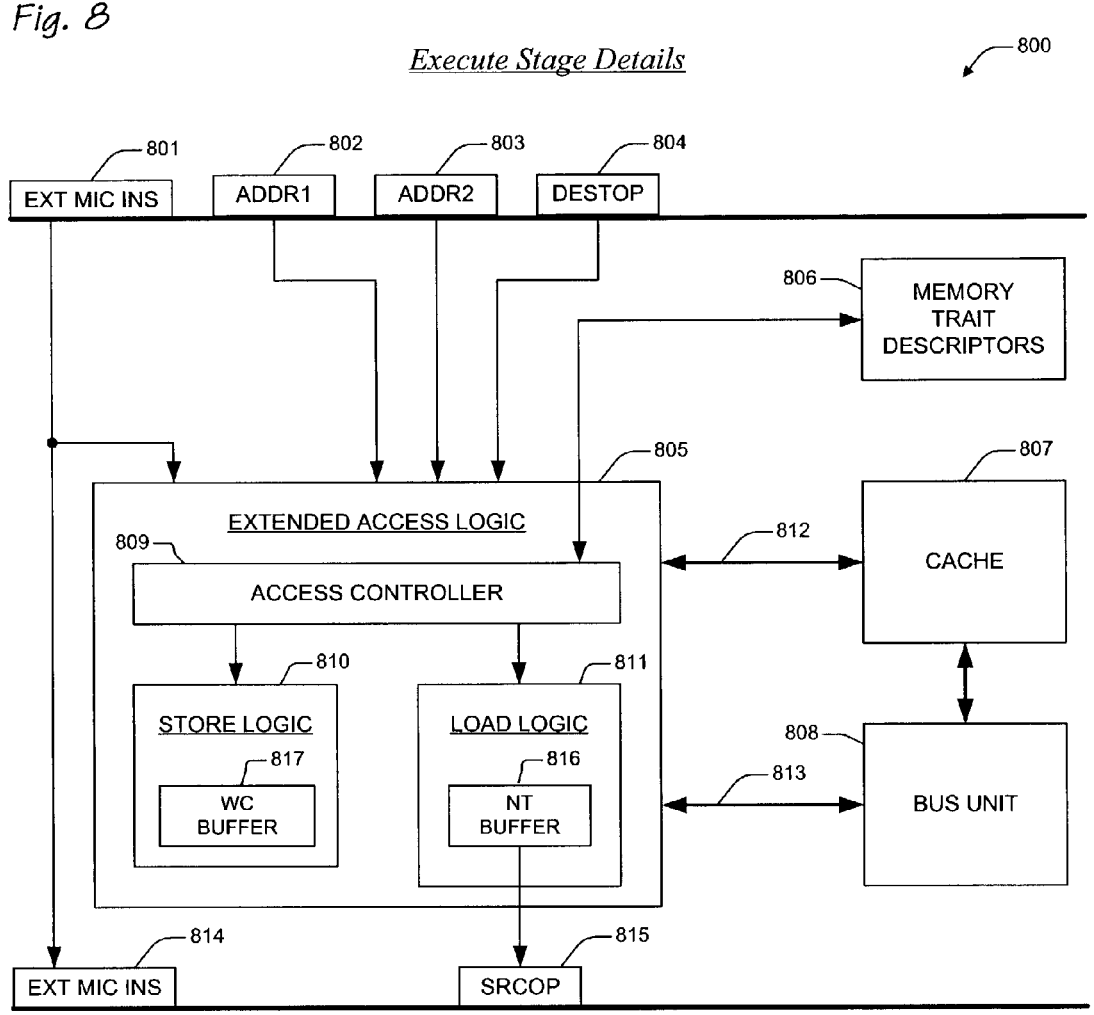
FIG. 8 is a block diagram illustrating extended execute stage logic within the microprocessor of FIG. 5.

Now referring to FIG. 8, a block diagram is presented illustrating extended execute stage logic 800 within the microprocessor of FIG. 5. The extended execute stage logic 800 has extended access logic 805 that is coupled to a memory cache 807 via bus 812 and a bus unit 808 via bus 813. The bus unit 808 is employed to conduct memory transactions over a memory bus (not shown). From a previous stage of a microprocessor according to the present invention, the extended access logic 808 receives micro instructions from an extended micro instruction buffer 801, two address operands from address buffers 802–803, and a destination operand from destination operand buffer 804. The extended access logic 805 is also coupled to a plurality of memory trait descriptors 806 which are configured according to architectural conventions of the host microprocessor. The extended access logic 805 includes an access controller 809, store logic 810, and load logic 811. The load logic 811 includes a non-temporal load buffer 816 and provides a source operand output to a source operand buffer 815. The store logic 810 has a write-combining buffer 817.

In operation, the extended execution logic 800 is employed to perform memory accesses to read operands from memory and to write operands to memory as directed by micro instructions provided in the extended micro instruction buffer 801. For read/load operations, the access controller receives one or more memory addresses from address buffers 802–803 and accesses the memory trait descriptors 806 to determine memory attributes associated with the load operations. In an x86 embodiment, the memory trait descriptors 806 comprise x86 cache and paging control registers, page directory and page table entries, memory type range registers (MTTRs), page attribute table (PAT), and external signal pins KEN#, WB/WT#, PCD, and PWT. The access controller 809 employs the information from these sources 806 according to x86 hierarchical memory attribute conventions to determine the default memory attribute for the load operations. For embodiments other than x86, the access controller 809 employs the information from memory trait descriptors 806 according to hierarchical memory attribute conventions corresponding to the specific architecture of the host microprocessor to determine the default memory attribute for the load operations. The memory addresses, along with attributes for the corresponding accesses, are provided to the load logic 811. Based upon the specific attributes provided, the load logic 811 obtains the source operands from cache 807 via bus 812 or directly from system memory (not shown) via the bus unit 808. The obtained source operands are provided to the source operand buffer 815 in synchronization with a pipeline clock signal (not shown). The extended micro instruction is also piped to extended micro instruction register 814 in synchronization with the clock signal. The source operands are thus provided to a following stage of the microprocessor.

For write/store operations directed by the extended micro instruction, the access controller 809 receives address information for the operation from address buffers 802–803 along with the operand to be stored from buffer 804. The access controller 809 accesses the memory trait descriptors 806 as described above with reference to load operations to determine the memory traits corresponding to the store access operation. The memory traits, address information, and the destination operand are provided to the store logic 810. Based upon the specific attributes provided, the store logic 810 writes the destination operand to cache 807 via bus 812 or directly to system memory via the bus unit 808.

The store logic 810 and load logic 811 according to the present invention are configured to execute store and load reference operations according to the processing requirements associated with the host processor's memory attribute model to include strong/weak ordering conventions (e.g., speculative execution rules) as well as cache access policies. In one embodiment, load and store operations are executed at different stages within a host microprocessor's pipeline.

For extended instructions that employ non-temporal memory reference prefixes, non-temporal operand specifiers for associated memory references (i.e., load, store, or both load and store) are provided to the access controller 809 via the opcode extension field (not shown) of an extended micro instruction within the extended micro instruction buffer 801. The access controller 809, as described above, determines the default memory traits for the prescribed accesses via information obtained from the memory trait descriptors 806. If the corresponding default traits allow for non-temporal accesses (i.e., cacheable traits such as write back trait), then the access controller 809 provides the non-temporal specifiers to the store logic 810/load logic 811 along with addresses and/or destination operand as described above. If the corresponding default traits do not allow for non-temporal accesses (i.e., uncacheable traits), then the access controller 809 provides the default traits to the store logic 810/load logic 811 along with addresses and/or destination operand.

If the corresponding default traits allow for non-temporal accesses, then for non-temporal load references, the load logic 811 first queries the cache 807 via bus 812 to determine if a corresponding load operand is present and valid in the cache 807 (i.e. a load hit). If so, then the load operation is execution according to the default memory trait. If, however, the corresponding load operand is not in the cache 807 (i.e., a load miss), then the load logic 811 fetches the cache line containing the load operand from memory via bus unit 808 and retains the cache line in the non-temporal buffer 816, thus bypassing the cache 807 altogether. The load operand is thus provided non-temporally to the source operand buffer 815.

For non-temporal store references the store logic 810 first queries the cache 807 to determine if a cache line corresponding to a store operand provided via the destination operand buffer 804 is present and valid in the cache 807 (i.e. a store hit). If so, then the store operation is execution according to the default memory trait rather than non-temporally. If, however, the cache line is not in the cache 807 (i.e., a store miss), then the store logic 810 does not allocate for the cache line in the cache 807, but rather provides the store operand to the write-combining buffer 817. The contents of the write combining buffer 817 are subsequently written directly to memory via the bus unit 808 in accordance with processor-specific hierarchical memory attribute processing conventions for the write-combining memory trait. In an x86 embodiment, the write combining attribute allows for write operations to memory to be delayed and combined, and coherency is not enforced. The store operand is thus provided non-temporally to memory.

Figure 9:
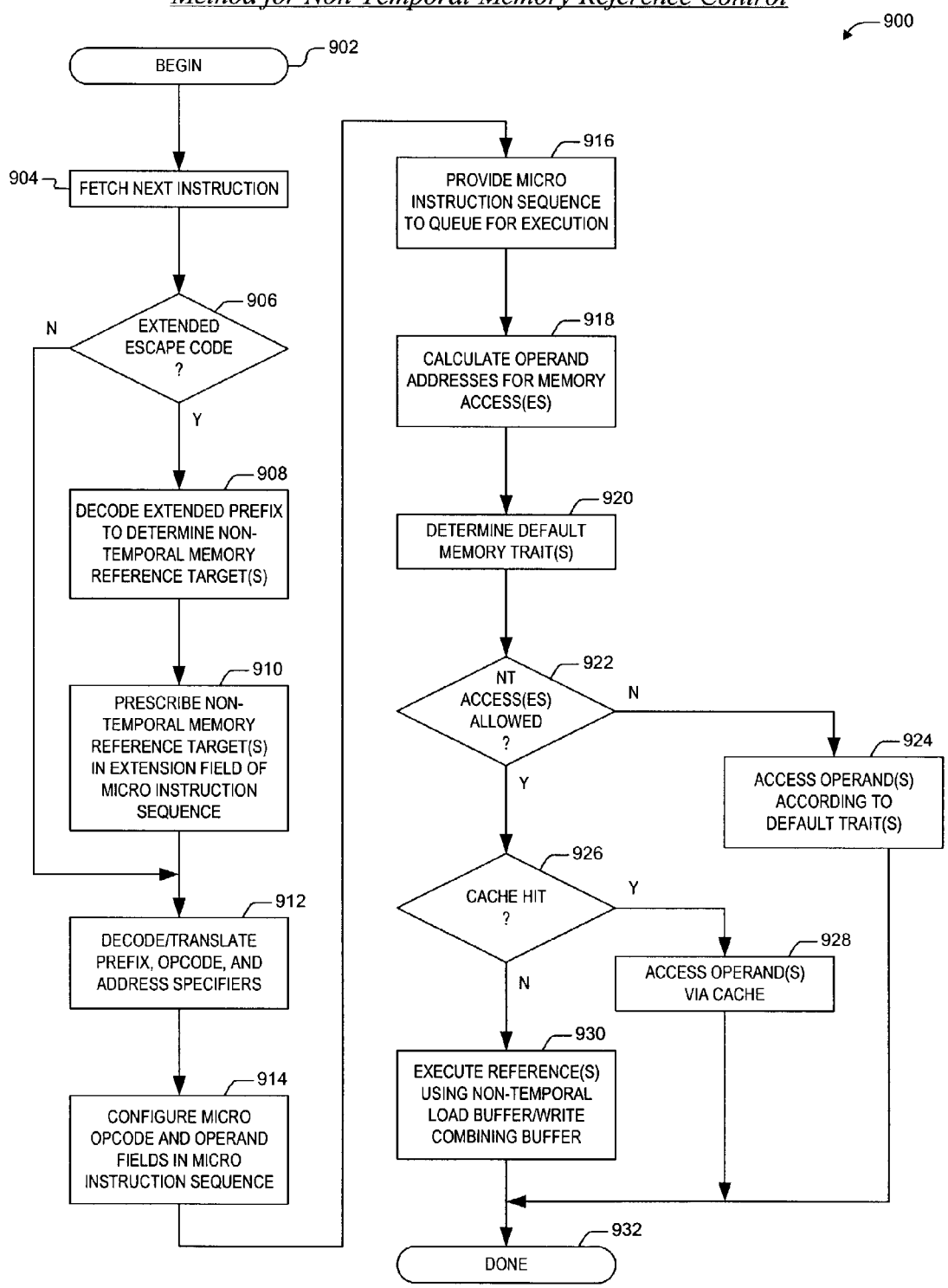
FIG. 9 is a flow chart depicting a method for controlling non-temporal memory references in a microprocessor according to the present invention.

Now referring to FIG. 9, a flow chart 900 is presented depicting a method for translating and executing instructions that enables a programmer to prescribe non-temporal memory references at the instruction level within in a microprocessor according to the present invention. Flow begins at block 902 wherein a program configured with extended feature instructions is provided to the microprocessor. Flow then proceeds to block 904.

At block 904, a next instruction is fetched from cache/memory. Flow then proceeds to decision block 906.

At decision block 906, the instruction fetched in block 904 is evaluated to determine if an extended escape code is provided according to the present invention. In an x86 embodiment, the evaluation is made to detect opcode value F1 (ICE BKPT). If the extended escape code is detected, then flow proceeds to block 908. If the extended escape code is not present, then flow proceeds to block 912.

At block 908, an extended prefix part of the extended instruction is decoded/translated to determine application of a non-temporal access that has been prescribed to override a default memory attribute for an associated memory reference prescribed by the instruction fetched in block 904. Flow then proceeds to block 910.

At block 910, a non-temporal access specifier for the associated memory reference is configured in an extension field of a corresponding micro instruction sequence. Flow then proceeds to block 912.

At block 912, all remaining parts of the instruction are decoded/translated to determine the prescribed memory reference, register operand locations, memory address specifiers, along with the application of existing architectural features prescribed by prefixes according to the existing instruction set architecture. Flow then proceeds to block 914.

At block 914, a micro instruction sequence is configured to specify the prescribed memory reference along with its corresponding opcode extensions. Flow then proceeds to block 916.

At block 916, the micro instruction sequence is provided to a micro instruction queue for execution by the microprocessor. Flow then proceeds to block 918.

At block 918, the micro instruction sequence is retrieved by address logic according to the present invention. The address logic generates address for the memory reference and provides the addresses to extended execution logic. Flow then proceeds to block 920.

At block 920, extended execution logic determines a default memory trait for the memory access using memory trait descriptive means according to the architecture of the microprocessor. Flow then proceeds to decision block 922.

At decision block 922, an evaluation is made to determine whether the non-temporal access is allowed by cache/memory model conventions of the microprocessor architecture to override the default attribute. If non-temporal access is allowed, then flow proceeds to decision block 926. If non-temporal access is not allowed, then flow proceeds to block 924.

At block 924, the memory access is performed by employing the default memory attribute determined in block 920. Flow then proceeds to block 932.

At decision block 926, an evaluation is made to determine if the cache line corresponding to the prescribed memory reference is present and valid in cache. If so, then flow proceeds to block 928. If there is a cache miss, then flow proceeds to block 930.

At block 928, since the cache line corresponding to the memory reference is present and valid in cache, then the memory reference is performed via cache using the default memory attribute determined in block 920. Flow then proceeds to block 932.

At block 930, the memory reference is executed by employing non-temporal means (e.g., non-temporal load buffer or/and write combining buffer). Flow then proceeds to block 932.

At block 932, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that allows a programmer to specify memory attributes for memory accesses at the instruction level which are not otherwise provided for by existing instructions in a microprocessor instruction set.

In addition, although a microprocessor setting has been employed to teach the present invention and its objects, features, and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus, providing for instruction level control of memory references within a microprocessor, the apparatus comprising:
    translation unit, for translating an extended instruction stored in a computer readable storage into a micro instruction sequence, wherein said extended instruction directs the microprocessor to perform a non-temporal access to a memory, and wherein said extended instruction comprises:
        an extended prefix, for specifying said non-temporal access prescribed by said extended instruction, wherein said non-temporal access cannot be specified by an existing instruction from an existing instruction set; and
        an extended prefix tag, for indicating said extended prefix to said translation logic, wherein said extended prefix tag is an otherwise architecturally specified opcode within said existing instruction set; and
    an extended execution logic, coupled to said translation unit, for receiving said micro instruction sequence, and for performing said non-temporal access to said memory.

2. The apparatus as recited in claim 1, wherein said extended instruction further comprises instruction entities according to said existing instruction set.

3. The apparatus as recited in claim 2, wherein said instruction entities prescribe an operation to be executed by the microprocessor, and wherein said operation comprises accessing said memory.

4. The apparatus as recited in claim 1, wherein said operation comprises a load, a store, or both said load and said store.

5. The apparatus as recited in claim 1, wherein said non-temporal access directs the microprocessor to preclude caching of data corresponding to said memory reference.

6. The apparatus as recited in claim 1, wherein said non-temporal access directs the microprocessor to preclude caching of load data corresponding to said memory reference and to retain said load data within a non-temporal buffer.

7. The apparatus as recited in claim 1, wherein said non-temporal access directs the microprocessor to preclude caching of store data corresponding to said non-temporal access and to execute said non-temporal as a store reference having a write combining memory attribute.

8. The apparatus as recited in claim 1, wherein said extended prefix comprises 8 bits.

9. The apparatus as recited in claim 1, wherein said extended prefix comprises:
    a source field, for prescribing that said non-temporal access applies to a load reference prescribed by said extended instruction; and
    a destination field, for prescribing that said non-temporal access applies to a store reference prescribed by said extended instruction.

10. The apparatus as recited in claim 1, wherein said existing instruction set comprises the x86 instruction set.

11. The apparatus as recited in claim 1, wherein said extended prefix tag comprises opcode F1 (ICE BKPT) in the x86 instruction set.

12. The apparatus as recited in claim 1, wherein said translation unit comprises:
    an escape instruction detection unit, for detecting said extended prefix tag;
    an instruction decoding unit, for determining an operation to be performed, wherein said operation comprises accessing said memory reference; and
    an extended decoding unit, coupled to said escape instruction detection unit and said instruction decoding unit, for determining said non-temporal access, and for prescribing said non-temporal access within said micro instruction sequence.

13. A microprocessor apparatus, for extending an existing instruction set to provide for instruction level non-temporal memory access control, the microprocessor apparatus comprising:
    an extended instruction, stored in a computer readable storage configured to prescribe a non-temporal access for a memory reference, wherein said extended instruction comprises a selected opcode in the existing instruction set followed by an n-bit extended prefix, said selected opcode indicating said extended instruction and said n-bit extended prefix indicating said non-temporal access, wherein said non-temporal access for said memory reference cannot otherwise be prescribed by an instruction according to the existing instruction set; and
    a translator, configured to receive said extended instruction, and configured to generate a micro instruction sequence directing a microprocessor to execute said memory reference via said non-temporal access.

14. The microprocessor apparatus as recited in claim 13, wherein said extended instruction further comprises:
    remaining instruction entities, configured to specify said memory reference, and wherein said memory reference comprises a load reference, a store reference, or both said load reference and said store reference.

15. The microprocessor apparatus as recited in claim 14, wherein said n-bit prefix comprises:
    a first non-temporal specification field, configured to indicate that said non-temporal access is to be employed for said load reference; and
    a second non-temporal specification field, configured to indicate that said non-temporal access is to be employed for said store reference.

16. The microprocessor apparatus as recited in claim 13, wherein said non-temporal access directs said microprocessor to preclude caching of data corresponding to said memory reference.

17. The microprocessor apparatus as recited in claim 13, wherein said non-temporal access directs said microprocessor to preclude caching of load data corresponding to said memory reference and to provide said load data within a non-temporal buffer.

18. The microprocessor apparatus as recited in claim 13, wherein said non-temporal access directs said microprocessor to preclude caching of store data corresponding to said memory reference and to execute said memory reference as a write combining access.

19. The microprocessor apparatus as recited in claim 13, wherein said n-bit extended prefix comprises 8 bits.

20. The microprocessor apparatus as recited in claim 13, wherein the existing instruction set is the x86 microprocessor instruction set.

21. The microprocessor apparatus as recited in claim 13, wherein said selected opcode comprises opcode ICE BKPT (i.e., opcode F1) in the x86 microprocessor instruction set.

22. The microprocessor apparatus as recited in claim 13, wherein said translator comprises:
 an escape instruction detector, for detecting said selected opcode within said extended instruction;
 an instruction decoder, for decoding remaining parts of said extended instruction to determine said memory reference; and
 an extended prefix decoder, coupled to said escape instruction detector and said instruction decoder, for decoding said n-bit extended prefix, and for specifying said non-temporal access within said micro instruction sequence.

23. A method for extending an existing instruction set architecture to provide for non-temporal memory reference control at the instruction level; the method comprising:
 providing an extended instruction from a computer readable memory, where the extended instructions stored, to a microprocessor the extended instruction including an extended tag along with an extended prefix, wherein the extended tag is a first opcode entity according to the existing instruction set architecture;
 prescribing, via the extended prefix, that a non-temporal access be employed by the microprocessor for a corresponding memory reference, wherein the memory reference is specified by remaining parts of the extended instruction; and
 executing the memory reference employing the non-temporal access, wherein the non-temporal access precludes the microprocessor from caching data corresponding to the memory reference.

24. The method as recited in claim 23, wherein said prescribing comprises:
 first specifying the memory reference within the remaining parts of the extended instruction, wherein said first specifying comprises employing a second opcode entity according to the existing instruction set architecture.

25. The method as recited in claim 23, wherein said providing comprises employing an 8-bit entity to configure the extended prefix.

26. The method as recited in claim 23, wherein said providing comprises selecting the first opcode entity according to the x86 microprocessor instruction set architecture.

27. The method as recited in claim 23, wherein said providing comprises choosing the x86 ICE BKPT opcode (i.e., opcode F1) as the extended tag.

28. The method as recited in claim 23, further comprising:
 translating the extended instruction into a micro instruction sequence that directs extended execution logic to execute the memory reference via the non-temporal access.

29. The method as recited in claim 28, wherein said translating comprises:
 within translation logic, detecting the extended tag; and
 decoding the extended prefix and the remaining parts according to extended translation rules to generate the micro instruction sequence.

30. The method as recited in claim 23, wherein said prescribing comprises:
 specifying that the non-temporal access applies to a source operand, a destination operand, or both.

* * * * *